Jan. 16, 1934.  H. A. THOMPSON  1,944,018
FLUID OPERATED GEARING
Filed June 29, 1931   3 Sheets-Sheet 2

Inventor
H. A. Thompson
By Horace C. Chandler
Attorney

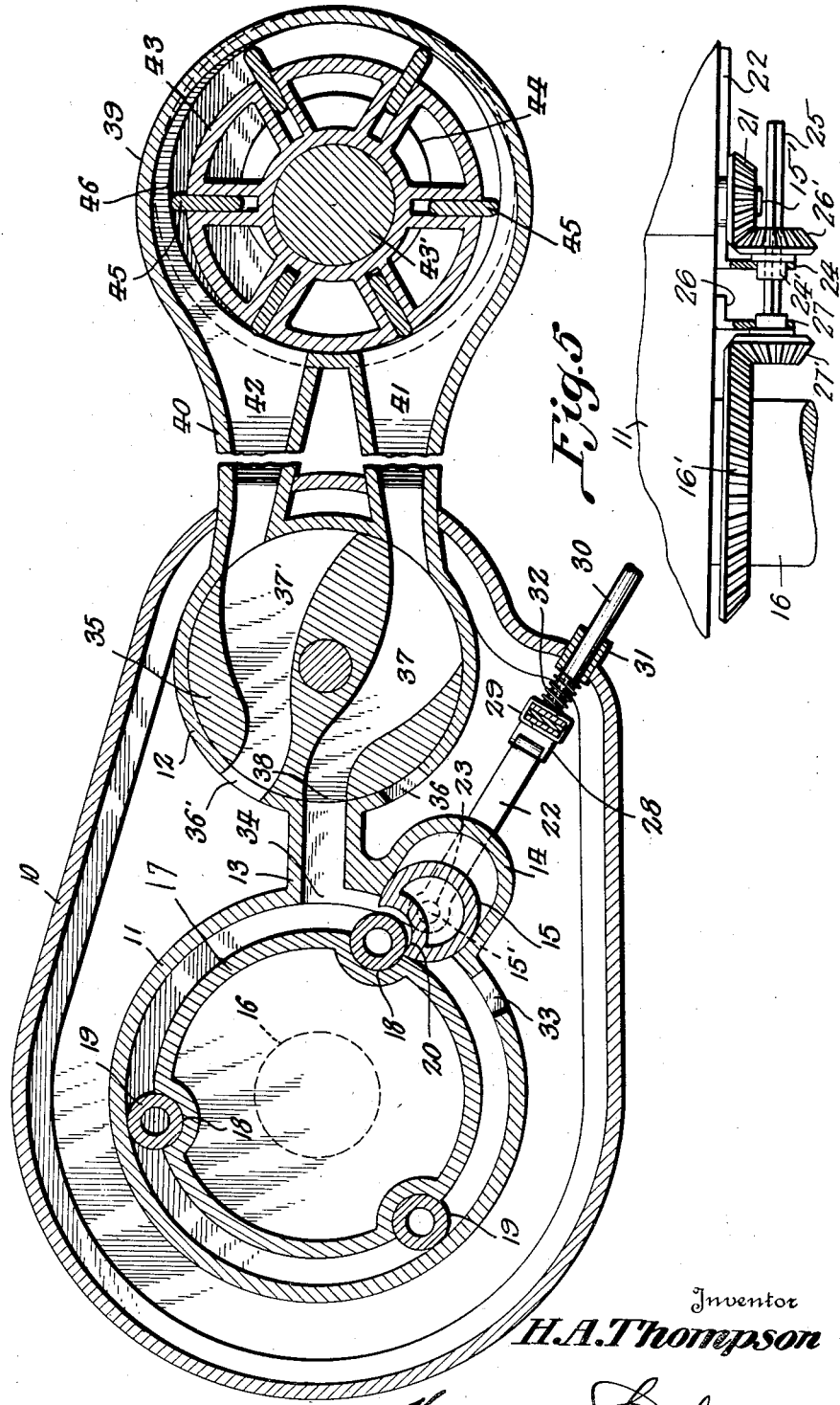

Patented Jan. 16, 1934

1,944,018

UNITED STATES PATENT OFFICE 1,944,018

FLUID OPERATED GEARING

Harry A. Thompson, North Hollywood, Calif.

Application June 29, 1931. Serial No. 547,696

3 Claims. (Cl. 103—125)

This invention relates to new and useful improvements in gearing, and particularly to gearing which are actuated, or driven, by fluids such as water, oil, glycerine, or the like.

One object of the present invention is to provide a gearing of this character which is capable of self-adjustment, commensurate with the load exerted on the driven shaft.

Another object is to provide a gearing of this character which is capable of manual adjustment, so that the operator, or driver of the vehicle equipped with the gearing, may readily control the speed ratio.

Other objects and advantages will be apparent from the following description, when taken in connection with the accompanying drawings.

In the drawings:

Figure 3 is a vertical central sectional view on the line 3—3 of Figure 2.

Figure 4 is a detail sectional view showing a modification of the driven rotor.

Figure 5 is an enlarged view of the gears, and the mountings thereof, certain parts being in section.

Figure 1:
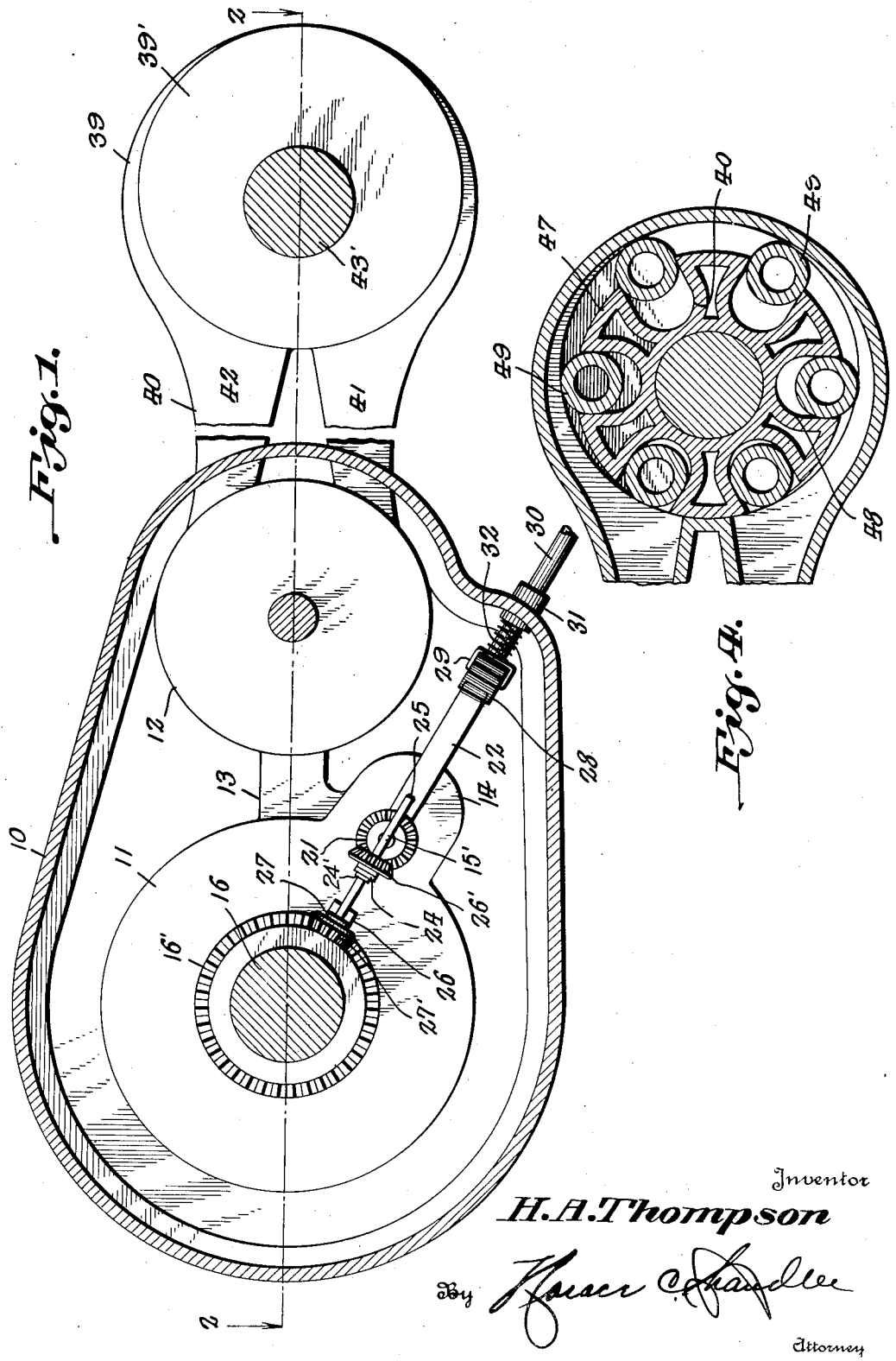
Figure 1 is a side elevation of the gearing, a portion of the side of the casing being removed.
Figure 2:
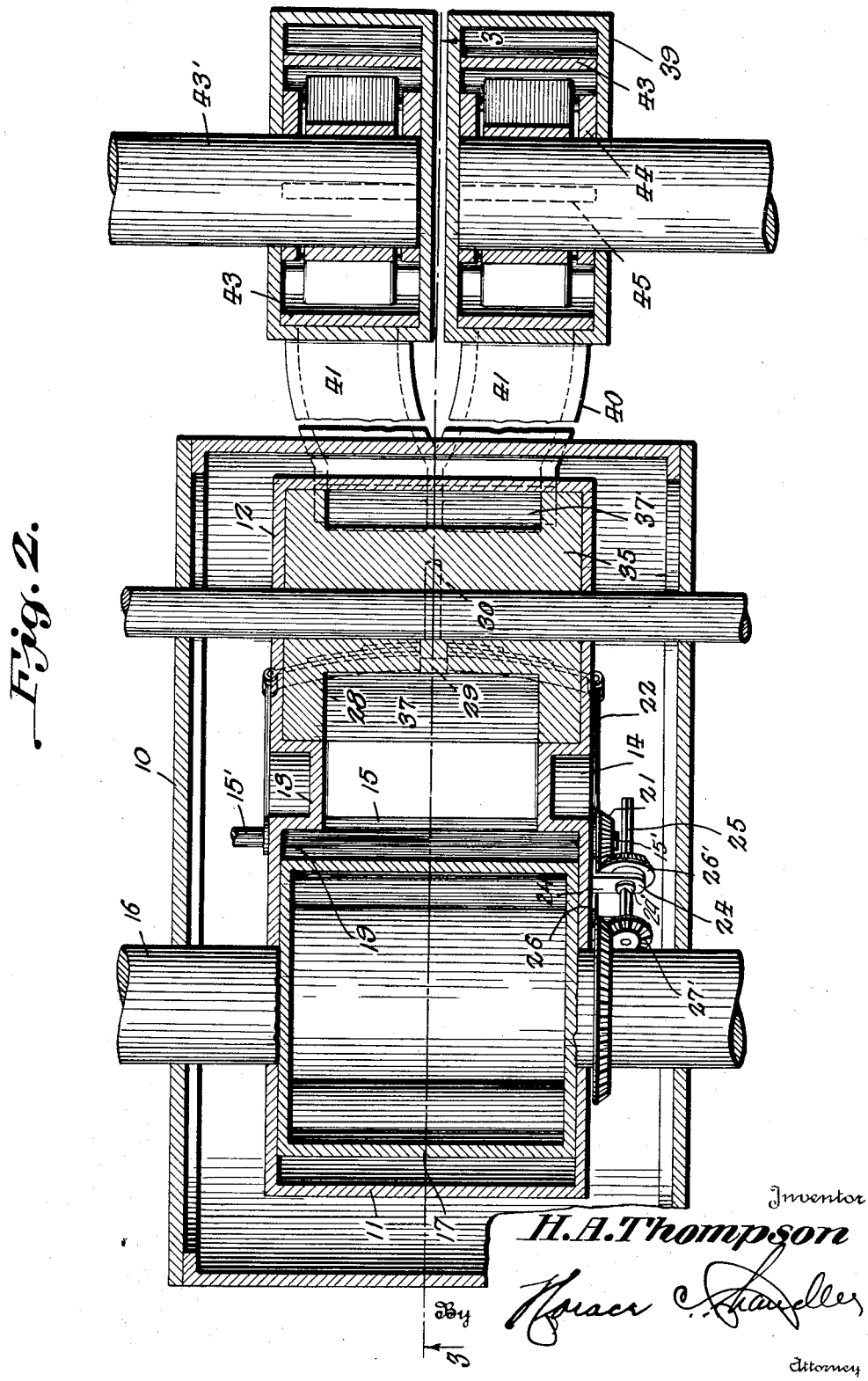
Figure 2 is a vertical longitudinal central sectional view on the line 2—2 of Figure 1.

Referring particularly to the accompanying drawings, 10 represents a casing which is adapted to contain quantity of oil, glycerine, or the like fluid. Within the lower portion of the casing 10 is a cylindrical casing 11, and in the upper portion of the casing 10 is a slightly smaller cylindrical casing 12, said casings 11 and 12 being connected by means of the hollow neck 13. Formed in the upper portion of the wall of the casing 11, at one side of the neck 13, is a radially extending recess 14, within which is disposed the cylindrical abutment member 15, said member being of a diameter to easily rotate and move longitudinally within said recess. Disposed in the casing 11, and mounted on the shaft 16, which extends transversely through the casing 11 and also through the sides of the casing 10, is a rotor 17, in the peripheral face of which, and extending longitudinally thereof, are the channels or recesses 18, in which are disposed the cylindrical members 19, said members having rolling contact with the interior of the wall of the casing 11, as the rotor turns, and each adapted to enter the recess 20, formed in the member 15, as said member rotates within said recess 14. The casing 11, with the rotor therein, constitutes the pump of the device. The abutment member 15 has a shaft 15', the ends of which project through and beyond the opposite sides of the recess 14, and fixed on one end of said shaft is a bevel gear 21. Disposed at each side of the portion of the casing 11 in which is located the recess 14 is a bar 22, each having an opening 23, receiving an end of the shaft 15', and an angularly extending portion 24, on one bar, supporting one end portion of a shaft 25 therein. Secured to the side of the casing 11 is a bracket bar 26, which has an angularly extending and apertured end 27, receiving the other end of the shaft 25. The shaft 25 is preferably square in cross section, so that the same may easily slide through the center of the bevel gear 26', which gear meshes with the gear 21, of the shaft 15'. Rotatably mounted in an opening in the laterally turned end 24, of the member 22, is the portion 24' of the hub of the gear 26', said hub having a square opening to slidably receive the square shaft 25 therein. A second bevel gear 27' is mounted on the shaft 25, which meshes with a bevel gear 16' carried by the shaft 16. It is to be understood that this shaft 16 is to be the shaft of, or be properly driven from the shaft of, a prime mover, such as the engine of an automobile, not shown. The other end of each of the bars 22 is movably connected with an end of a transversely extending leaf spring 28, the center of which is connected, by means of a band 29, to the adjacent end of a rod 30, which is slidably disposed through a bushing 31, secured in an opening in the wall of the casing 10. A coil spring 32 encircles the rod 30, between the center of the leaf spring 28, and the inner end of the bushing 31, which, together with the leaf spring, serves to hold the member 15 in contact with the periphery of the rotor 17. The outer end of the rod 30 is adapted to have any suitable means applied thereto, for the foot operation thereof, whereby to permit the operator to control the operation of the gearing, at will, and at times when it is not desired to have the gearing operate automatically, as will be readily understood. It will be particularly noted that there are three of the members 19, for successive engagement in the recess in the abutment member 15, as said abutment member 15 is rotated through the medium of the gears 21, 26', 27', 16', the latter being driven by the shaft 16, such gearing being so proportioned as to rotate the abutment member 15 three times during a single rotation of the member 17. The casing 11 is formed with an inlet opening 33, at one side of the recess 14, through which the rotor 17 draws oil from the casing 10, and discharge said oil into the neck, through the outlet opening 34, of the casing 11, at the other side of said recess 14.

In the wall of the casing 12, at opposite sides of the neck 13, are the ports 36 and 36′, and within said casing is an oscillatory valve 35, having the passages 37 and 37′, each adapted to register one end with the port 38, while the other passage registers its corresponding end with one or the other of the ports 36—36′, in accordance with the oscillated position of the valve 35. The other side of casing 12 is connected to a divided casing 39, by means of a member 40, which has the Y-shaped passages 41 and 42, the outer branches of which passages connect with the casing portions 39′. In each of the casing portions 39′ is a rotor 43, which is secured on the end of a shaft 43′, extending into said casing portion. Surrounding the end of each shaft 43′, at each side of each casing portion 39′, is a cam ring 44. Slidable radially in the rotors 43 are the vanes or blades 45, the end portions of the inner edges of which engage with the peripheries of the cam rings 44, whereby to cause the said blades to be projected during a portion of a rotation of the rotor, suitable rings 46, arranged in the casing portions 39′, with which the outer edge portions of the blades engage, serving to return the blades into the openings or pockets of the rotors. These rings 46 are concentric with the cam rings 44, but are eccentric to the rotors 43, whereby said blades will be gradually projecting from the retors, and withdrawn thereinto, as said rotors turn. The casing 39, with the rotor 43 therein, constitutes the motor of the device.

In the description of the operation of the invention, it will be assumed that the shaft 16 represents the drive shaft, which may be the shaft of the engine of an automobile, while the shafts 43′ may be assumed to be the driven shaft, or rear axle sections of the automobile, while the various devices between the shafts 16 and 43′ represent the various gear devices between the engine and rear axle of an automobile. Assuming that the casing 10 is supplied with the proper quantity of oil, glycerine, or other suitable fluid of the proper consistency, and the engine set in motion, the member 17 will be rotated whereby to draw fluid, from the casing 10, through the opening 33, into the casing 11, and carry the same around, by the members 19, and discharge such fluid through the opening in the neck 13, from whence it passes through one of the passages of the rotary member 35, into the casing portions 39′, to cause the rotation of the rotors 43, and the driving of the shafts 43′. The springs 28 and 32 serve to maintain constant and firm contact of the rotary abutment member 15 with the outer face of the rotary member 17, whereby to prevent any of the fluid, driven by the members 19, from going past the member 17, thereby forcing the fluid to pass through the neck 13. The valve member 35 is rotated so that, for instance, the passage 37 establishes communication between the port 38 and the connection 41, while the passage 37′ establishes communication between the connection 42 and the port 36′, which latter leads into the casing 10, as clearly shown. As the fluid is forced through the passage 37, and into the casings 39′, it will impinge on a blade 45, of each of the rotors 43, whereby to cause the rotation of said rotors, and the driving of the shafts 43′. The fluid, after causing the rotation of the rotors 43, passes around and out through the passage 37′, of the rotary valve 35, and back into the casing 10, by means of the port 36′. In the event that a load is placed on the shafts 43′, as when the automobile is going up a grade, the rotors 43 will offer resistance to the flow of fluid which is attempting to rotate them, with the result that pressure will pile up all along from the rotors 43 to the rotor 17. Due to this back pressure within the neck 13, the pressure will seek an outlet between the rotor 17 and the rotor 15, which are spring pressed together. The fluid pressure can separate the members 15 and 17, whereby to permit some of this excess pressure to get past the said point, and escape back into the casing 10, through the opening 33. It is to be understood that the gearing between the members 15 and 17 are so proportioned that the member 17 will make one complete revolution, while the member 15 is making three complete turns, whereby the recess 20 will be positioned to receive each of the members 19 successively, which will cause the member 15 to rotate and bring its unrecessed surface in contact with the face of the member 17, between the members 19, which contact will cause the abutment member 15 to turn. The greater the back pressure of fluid, in the neck 13, the greater will be the pressure to force the abutment member 15 outwardly, and thereby permit the fluid to pass on around within the casing 11, to escape into the casing 10, through the opening 33. The same effect as this back pressure can be obtained by means within the control of the operator, which consists in actuating the rod 30, which, through the medium of the springs and bars, withdraws the abutment member 15 away from contact with the member 17, whereby to permit oil, or other fluid being used in the casing 10, to pass this point and escape through the opening 33. Thus, when the device is operating automatically, the degree of relief, between the members 15 and 17 will be governed by the degree of back pressure resulting from the load impressed on the driven shafts 43′. When it is desired to cause the shafts 43′ to be driven in the opposite direction, the operator rotates the valve member 35 so that the passage 37′ registers with the port 38, and the passage 37 registers with the port 36, the other ends of these passages being thus reversed from their former positions so that their other ends register respectively with the passages of the connection 40, whereby 42 becomes the inlet and 41 the outlet.

Attention is called to the fact that the sleeve 31, which is engaged in the opening in the wall of the casing 10, and receives slidably therethrough the rod 30, is threaded whereby the same may be turned to regulate the tension of the springs 28 and 32, and thereby the degree of contact of the abutment member 15 with the face of the member 17.

A braking effect may be accomplished by simply rotating the valve member 35 so as to partially close the outlet ports 36 and 36′.

Upon particular reference to Figure 4, it will be seen that the rotor 47 has a plurality of radiating pockets 48, in its periphery, and that in each of these pockets is a tubular member 49, similar to the tubular members 19, of the member 17, such members 49 taking the place of the vanes or blades 45, and operating between the rings 44 and 46, as will be clear from an inspection of the drawings.

The degree to which the port 38 is open regulates the amount of fluid which will be delivered to the rotors 43, and thereby the speed of drive delivered to the shaft 43'. It will thus be seen that, by manipulating this rotary member 35, to regulate the flow of fluid to the rotors 43, the driving speed can be readily controlled.

When the valves and ports are so adjusted as to permit the free flow of the maximum amount of fluid from the casing 10, to the rotors 43, thereby producing the greatest driving efficiency in the rotors 43. This is capable of automatic regulation and control, through the actuation of the member 15, or through manual control, by the same means, in connection with the rotary valve 35.

What is claimed is:

1. A fluid driving means for a fluid gearing including a casing for containing a motive fluid, a pump casing therein having an intake port and an outlet passage, a rotor in the pump casing, transversely arranged cylindrical vanes seated in the periphery of said rotor, said pump casing having a recess between said port and passage, a rotatable spring pressed and recessed abutment in said recess arranged for engagement by said vanes, gearing for driving the abutment simultaneously with the rotor, and means for maintaining said gearing in mesh when said abutment is moved by back pressure of fluid thereagainst.

2. A fluid driving means for a fluid gearing, including a casing for containing a motive fluid, a pump casing therein having an intake port and an outlet passage, a rotor in the pump casing, transversely arranged cylindrical vanes seated in the periphery of said rotor, a rotatable and recessed abutment mounted to receive said vanes within its recesses, means for urging said abutment in the direction of said rotor and means for rotating said abutment in synchrony with said rotor.

3. A fluid driving means for a fluid gearing, including a casing for containing a motive fluid, a pump casing therein having an intake port and an outlet passage, a rotor in the pump casing, transversely arranged cylindrical vanes seated in the periphery of said rotor, a rotatable and recessed abutment mounted to receive said vanes within its recesses, means for urging said abutment in the direction of said rotor, manually operatable means for withdrawing said abutment from engagement with said rotor, and means for rotating said abutment in synchrony with said rotor.

HARRY A. THOMPSON.